United States Patent
Liu et al.

(10) Patent No.: US 11,373,012 B2
(45) Date of Patent: Jun. 28, 2022

(54) SMART DISPLAY CARD AND OPERATION METHOD THEREOF

(71) Applicant: E Ink Holdings Inc., Hsinchu (TW)

(72) Inventors: Chuen-Jen Liu, Hsinchu (TW); Jia-Hong Xu, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 533 days.

(21) Appl. No.: 16/429,060

(22) Filed: Jun. 3, 2019

(65) Prior Publication Data

US 2019/0377909 A1    Dec. 12, 2019

(30) Foreign Application Priority Data

Jun. 11, 2018 (TW) .................................. 107119956

(51) Int. Cl.
| | |
|---|---|
| *G06F 21/00* | (2013.01) |
| *G06F 21/77* | (2013.01) |
| *G09G 3/36* | (2006.01) |
| *G06F 1/28* | (2006.01) |
| *G06F 21/84* | (2013.01) |

(52) U.S. Cl.
CPC ................ *G06F 21/77* (2013.01); *G06F 1/28* (2013.01); *G06F 21/84* (2013.01); *G09G 3/36* (2013.01)

(58) Field of Classification Search
None
See application file for complete search history.

(56) References Cited

U.S. PATENT DOCUMENTS

| | | | |
|---|---|---|---|
| 4,794,236 A | 12/1988 | Kawana et al. | |
| 6,724,103 B2 * | 4/2004 | Parrault | G06K 19/07749 |
| | | | 307/104 |
| 8,276,823 B2 | 10/2012 | Chen | |
| 8,322,624 B2 | 12/2012 | Finn | |

(Continued)

FOREIGN PATENT DOCUMENTS

| | | |
|---|---|---|
| TW | 201544984 | 12/2015 |
| TW | 201816649 | 5/2018 |

(Continued)

OTHER PUBLICATIONS

PinoutGuide, "Smart card (SIM Card) interface pinout", Pinoutguide. com, May 30, 2017, p. 1-5; accessed Dec. 18, 2021. (Year: 2017).*

*Primary Examiner* — Jeffery L Williams
(74) *Attorney, Agent, or Firm* — JCIPRNET

(57) ABSTRACT

A smart display card and an operation method thereof are provided. The smart display card includes a connection interface, a security chip, a processing chip, and a display. The connection interface receives a power signal and a data signal provided by an external card reader when the smart display card is connected to the external card reader. The security chip is coupled to the connection interface and receives the power signal and the data signal. The security chip complies with a first communication protocol. The processing chip is coupled to the connection interface and receives the power signal and the data signal. The processing chip complies with a second communication protocol different from the first communication protocol. The display is coupled to the processing chip. The processing chip drives the display based on the power signal and the data signal.

9 Claims, 3 Drawing Sheets

(56) References Cited

U.S. PATENT DOCUMENTS

| | | | | |
|---|---|---|---|---|
| 8,678,293 B2* | 3/2014 | Chen | | G06K 19/0702 |
| | | | | 235/492 |
| 9,916,529 B1* | 3/2018 | Lee | | G06K 19/14 |
| 2005/0242197 A1* | 11/2005 | Morrow | | G06K 7/0008 |
| | | | | 235/492 |
| 2013/0081127 A1 | 3/2013 | Chen | | |
| 2013/0086389 A1* | 4/2013 | Suwald | | G06Q 20/341 |
| | | | | 713/185 |
| 2014/0339315 A1* | 11/2014 | Ko | | G06Q 20/3227 |
| | | | | 235/492 |
| 2016/0004945 A1* | 1/2016 | Wade | | G07F 7/00 |
| | | | | 235/492 |
| 2016/0042678 A1* | 2/2016 | Liu | | G09G 3/20 |
| | | | | 345/205 |
| 2016/0307089 A1* | 10/2016 | Wurmfeld | | G06K 19/0723 |
| 2017/0364788 A1* | 12/2017 | Cardinal | | G06K 19/07707 |
| 2018/0357640 A1* | 12/2018 | Kanng rd | | G06Q 20/367 |
| 2019/0377909 A1* | 12/2019 | Liu | | G06F 21/84 |
| 2020/0226090 A1* | 7/2020 | Arnouse | | G06F 13/4081 |
| 2021/0011677 A1* | 1/2021 | Rao | | G06F 3/1446 |
| 2021/0150160 A1* | 5/2021 | Xu | | G06K 7/10029 |

FOREIGN PATENT DOCUMENTS

| | | |
|---|---|---|
| TW | 201816666 | 5/2018 |
| TW | 201818300 | 5/2018 |

\* cited by examiner

SMART DISPLAY CARD AND OPERATION METHOD THEREOF

CROSS-REFERENCE TO RELATED APPLICATION

This application claims the priority benefit of Taiwan application serial no. 107119956, filed on Jun. 11, 2018. The entirety of the above-mentioned patent application is hereby incorporated by reference herein and made a part of this specification.

BACKGROUND OF THE INVENTION

1. Field of the Invention

The invention relates to a smart card, and more particularly, to a smart display card and an operation method thereof.

2. Description of Related Art

In general, smart display cards can be classified into two types: those without batter and those with battery. For the conventional smart display card without battery, Near Field Communication (NFC) is mainly used for a wireless power supply. However, the drawback is that an available area of the card would affect an antenna design for NFC. Moreover, because the power energy provided the wireless power supply of NFC is lower, the size and resolution of a display of the smart display card would be limited by the power supply capability of NFC. Therefore, the smart display card without battery has higher design difficulty and higher manufacturing cost. Further, in the conventional smart display card, a driver chip for driving the display is additionally disposed to at rear end of a security chip so data and power can be obtained by the security chip. In other words, the conventional smart display card needs to conduct a security verification again for the additionally disposed driver chip, resulting in more disadvantages for the conventional smart display card in terms of higher manufacturing cost and higher security verification cost.

SUMMARY OF THE INVENTION

The invention provides a smart display card and an operation method thereof. When the smart display card is connected to an external card reader, convenient display functions can be provided by a display with smart card functions provided at the same time.

The smart display card of the invention includes a connection interface, a security chip, a processing chip, and a display. The connection interface receives a power signal and a data signal provided by an external card reader when the smart display card is connected to the external card reader. The security chip is coupled to the connection interface and receives the power signal and the data signal. The security chip complies with a first communication protocol. The processing chip is coupled to the connection interface and receives the power signal and the data signal. The processing chip complies with a second communication protocol. The first communication protocol is different from the second communication protocol. The display is coupled to the processing chip. The processing chip drives the display based on the power signal and the data signal.

The operation method of the smart display card of the invention includes steps of: receiving a power signal and a data signal provided by an external card reader by a connection interface of the smart display card when the smart display card is connected to the external card reader; receiving the power signal and the data signal by a security chip of the smart display card complying with a first communication protocol; receiving the power signal and the data signal by a processing chip of the smart display card complying with a second communication protocol, wherein the first communication protocol is different from the second communication protocol; and driving the display by the processing chip based on the power signal and the data signal.

Based on the above, according to the smart display card and the operation method, convenient display functions can be provided by the display with secure smart card functions provided at the same time. Further, the smart display card of the invention can also have lower manufacturing cost and lower security verification cost.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
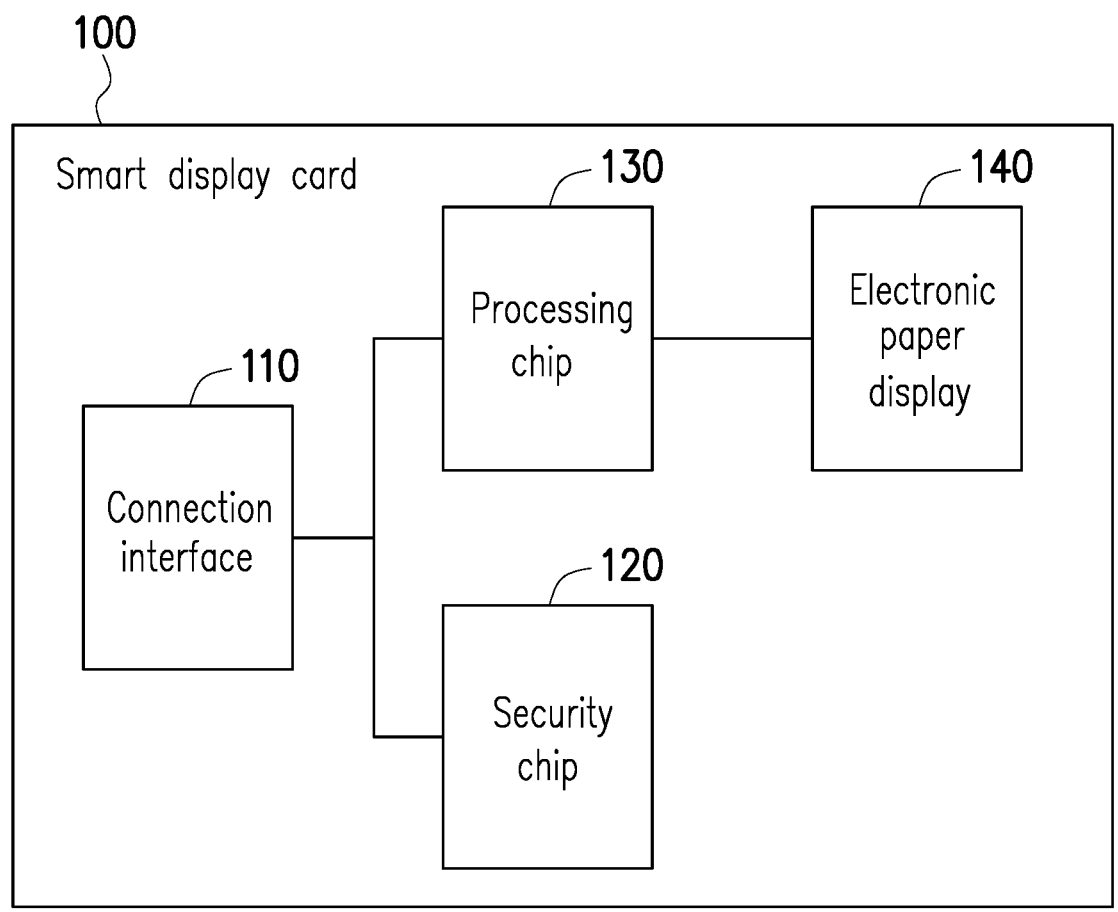
FIG. 1 is a block diagram of a smart display card according to an embodiment of the invention.

Reference will now be made in detail to the present preferred embodiments of the disclosure, examples of which are illustrated in the accompanying drawings. Wherever possible, the same reference numbers are used in the drawings and the description to refer to the same or like parts.

In order to make content of the invention more comprehensible, embodiments are described below as the examples to prove that the invention can actually be realized. Moreover, elements/components/steps with same reference numerals represent same or similar parts in the drawings and embodiments.

FIG. 1 is a block diagram of a smart display card according to an embodiment of the invention. With reference to FIG. 1, a smart display card 100 includes a connection interface 110, a security chip 120, a processing chip 130 and an electronic paper display 140. The security chip 120 and the processing chip 130 are coupled to the connection interface 110, and the processing chip 130 is coupled to the electronic paper display 140. The processing chip 130 is coupled to the electronic paper display 140 by a serial peripheral interface (SPI), for example. The security chip 120 complies with a first communication protocol, and the processing chip 130 complies with a second communication protocol. The first communication protocol is different from the second communication protocol. In this embodiment, for example, the first communication protocol is IOS7816 communication protocol, and the second communication protocol is a custom communication protocol. However, the invention is not limited in this regard. In an embodiment, the security chip 120 may also be a communication protocol complying with other security chip standards.

The security chip 120 may be an embedded chip containing personal information and complying with a preset smart card communication protocol. The security chip 120 may include, for example, a processing unit, a memory unit and a password system, and may support various communication protocols or encryption mechanisms. Smart card functions provided by the security chip 120 may include, for example, functions of a credit card, a stored-value card or a payment card, which are not particularly limited by the invention. In an embodiment, the connection interface 110 and the security chip 120 may be considered as being preset in the smart display card 100, and based on this smart card configuration, the processing chip 130 and the electronic paper display 140 are additionally disposed in the smart display card 100.

The processing chip 130 is a central processing unit (CPU), or other programmable devices for general purpose or special purpose, such as a microprocessor and a digital signal processor (DSP), a programmable controller, an application specific integrated circuit (ASIC), a programmable logic device (PLD) or other similar processing circuits or a combination of above-mentioned circuits. The processing chip 130 may be designed to be applicable to the custom communication protocol, and the custom communication protocol is different from the communication protocol of the security chip 120.

The electronic paper display 140 may be an electrophoretic display (EPD) panel, an electro-wetting display (EWD) panel, a cholesteric liquid crystal display (CLCD) panel or other bi-stable display panels, which are not particularly limited by the invention. In this embodiment, the processing chip 130 drives a plurality of electro-phoretic units in the electronic paper display 140 based on the data signal and the power signal received from the connection interface 110 so as to update a display frame of the electronic paper display 140. Further, in an embodiment, the smart display card 100 may also include a display of other type to provide the display frame by the display of other type instead of the electronic paper display 140.

In this embodiment, an interface type of the connection interface 110 is determined based on the first communication protocol. The security chip 120 and the processing chip 130 are respectively coupled to the connection interface 110, and respectively receive the power signal and the data signal from the connection interface 110. It should be noted that, the data signal of the present embodiment may include first data corresponding to the first communication protocol and second data corresponding to the second communication protocol. Specifically, the security chip 120 is configured to receive the first data, and the security chip 120 outputs an error signal when the second data is received by the security chip 120. The processing chip 130 is configured to receive the second data, and the processing chip 130 filters out the first data. In other words, because the communication protocol of the security chip 120 for performing the preset smart card functions is different from the communication protocol of the processing chip 130 for driving the electronic paper display 140 in the smart display card 100, there is no mutual interference between the security chip 120 and the processing chip 130 in terms of communication and transmission. Therefore, the smart display card 100 of the present embodiment can provide secure and convenient smart card functions and display functions at the same time.

Figure 2:
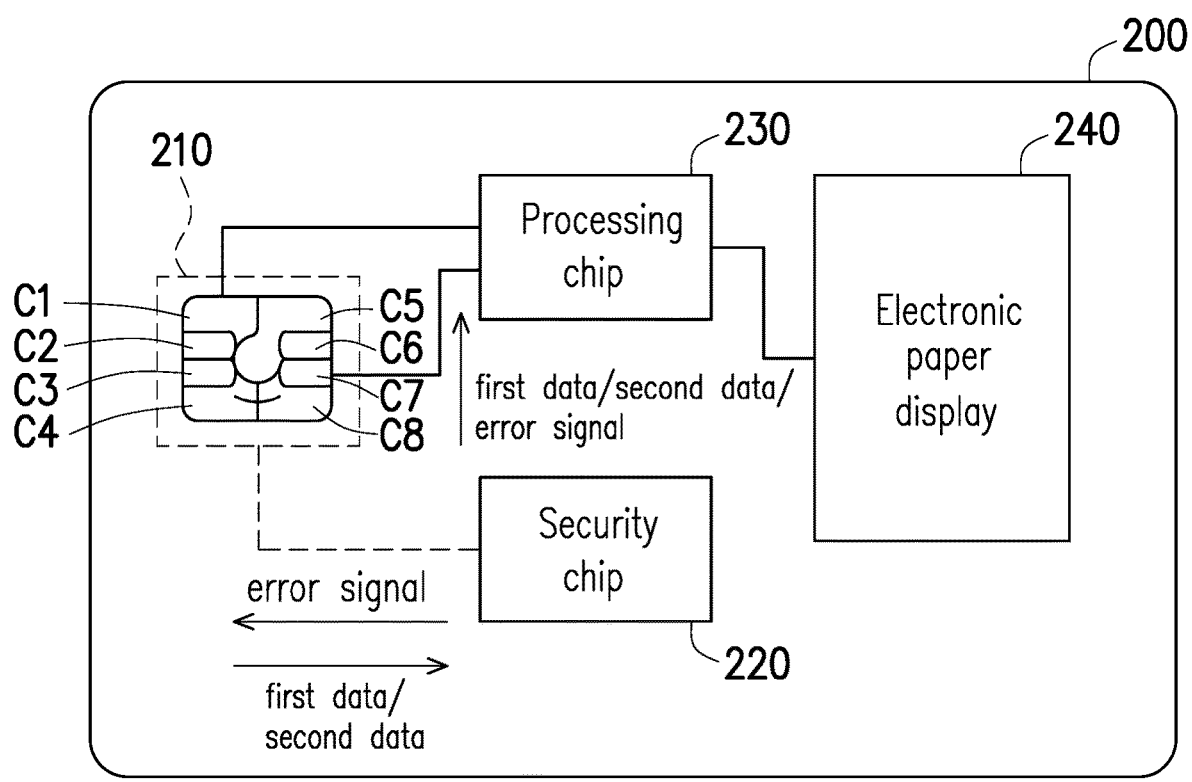
FIG. 2 is a schematic diagram of a smart display card according to an embodiment of the invention.

FIG. 2 is a schematic diagram of a smart display card according to an embodiment of the invention. With reference to FIG. 2, a smart display card 200 includes a connection interface 210, a security chip 220, a processing chip 230 and an electronic paper display 240. In this embodiment, the security chip 220 is coupled to the connection interface 210. The security chip 220 and the connection interface 210 are both designed based on, for example, IOS7816 communication protocol, and thus a plurality of pins C1 to C8 of the connection interface 210 are thereby determined based on IOS7816 communication protocol. For instance, the pin C1 is a power supply (VCC) pin; the pin C2 is a reset (RST) pin; the pin C3 is a clock (CLK) pin; C4 is a spare pin; C5 is a ground (GND) pins; C6 is a programming (VPP) pin; C7 is an input/output (I/O) pin; and C8 is a spare pin. The security chip 220 may be directly coupled to each of aforesaid pins so the security chip 220 can provide corresponding smart card functions when the smart display card 200 is inserted to an external card reader.

In this embodiment, the processing chip 230 is directly coupled to the connection interface 210 and receives the data signal and the power signal without going through the security chip 220. The communication protocol of the processing chip 230 may be customized by manufacturers of the processing chip 230 so each of the processing chip 230 and the security chip 220 can comply with a different communication protocol. In other words, the processing chip 230 directly receives the data signal and the power signal right by the connection interface 210 customized in advance for the smart display card 200. The processing chip 230 can directly receives the data signal and the power signal from the connection interface 210 so as to drive the electronic paper display 240. Therefore, the smart display card 200 additionally disposed with the processing chip 230 does not need to conduct the security verification again. Accordingly, the smart display card 200 can have lower manufacturing cost and lower security verification cost. It should be noted that, the processing chip 230 may be, for example, directly coupled to the power supply pin C1 and the input/output pin C7 of the connection interface 210. However, the invention is not limited in this regard. In an embodiment, the security chip 230 may also be coupled to other pins of the connection interface 210 rather than being limited by what illustrated in FIG. 2.

In this embodiment, when the smart display card 200 is connected to the external card reader, the smart display card 200 can receive the power signal and the data signal provided by the external card reader by the connection interface 210. Also, since the security chip 220 and the processing chip 230 are commonly coupled to the power supply pin C1 and the input/output pin C7, the power supply pin C1 and the input/output pin C7 can simultaneously provide the power signal and the data signal to the security chip 220 and the processing chip 230. In this embodiment, the data signal provided by the external card reader may include at least one of the first data complying with the communication protocol of the security chip 220 and the second data complying with the communication protocol of the processing chip 230.

For instance, the connection interface 210 can simultaneously provide at least one of the first data and the second data to the security chip 220 and the processing chip 230. When the first data is received by the security chip 220, the security chip 220 executes operations corresponding to the smart card functions based on the first data. When the second data is received by the security chip 220, the security chip 220 outputs an error signal. When the first data is received by the processing chip 230, the processing chip 230 filters out the first data. When the second data is received by the processing chip 230, the processing chip 230 drives a plurality of electro-phoretic units in the electronic paper display 240 based on the second data so as to update a display frame of the electronic paper display 240. However, when the error signal is outputted by the security chip 220, the error signal is then provided to the external card reader and the processing chip 230 by the connection interface 210. In this case, it is possible that the external card reader does not execute corresponding actions while the processing chip 230 filters out the error signal.

In other words, each of the security chip 220 and the processing chip 230 is an independent system. When the smart display card 200 is connected to the external card reader, the security chip 220 and the processing chip 230 would be enabled at the same time. The external card reader can communicate with the secure chip 220 alone to exchange data, or provide only the second data to update the display frame of the electronic paper display 240. In this embodiment, the external card reader may be written with programming code for updating the display frame of the electronic paper display 240 and may include only the function for communicating with the security chip 220. Therefore, the processing chip 230 of the present embodiment is applicable to the external card reader capable of updating the display frame of the electronic paper display, or to various external card readers that only support smart card functions.

In addition, enough teaching, suggestion, and implementation regarding other device features, technical details and implementation methods of the connection interface 210, the security chip 220, the processing chip 230 and the electronic paper display 240 in this embodiment may be obtained from the embodiment of FIG. 1, and thus related descriptions thereof are not repeated hereinafter.

Figure 3:
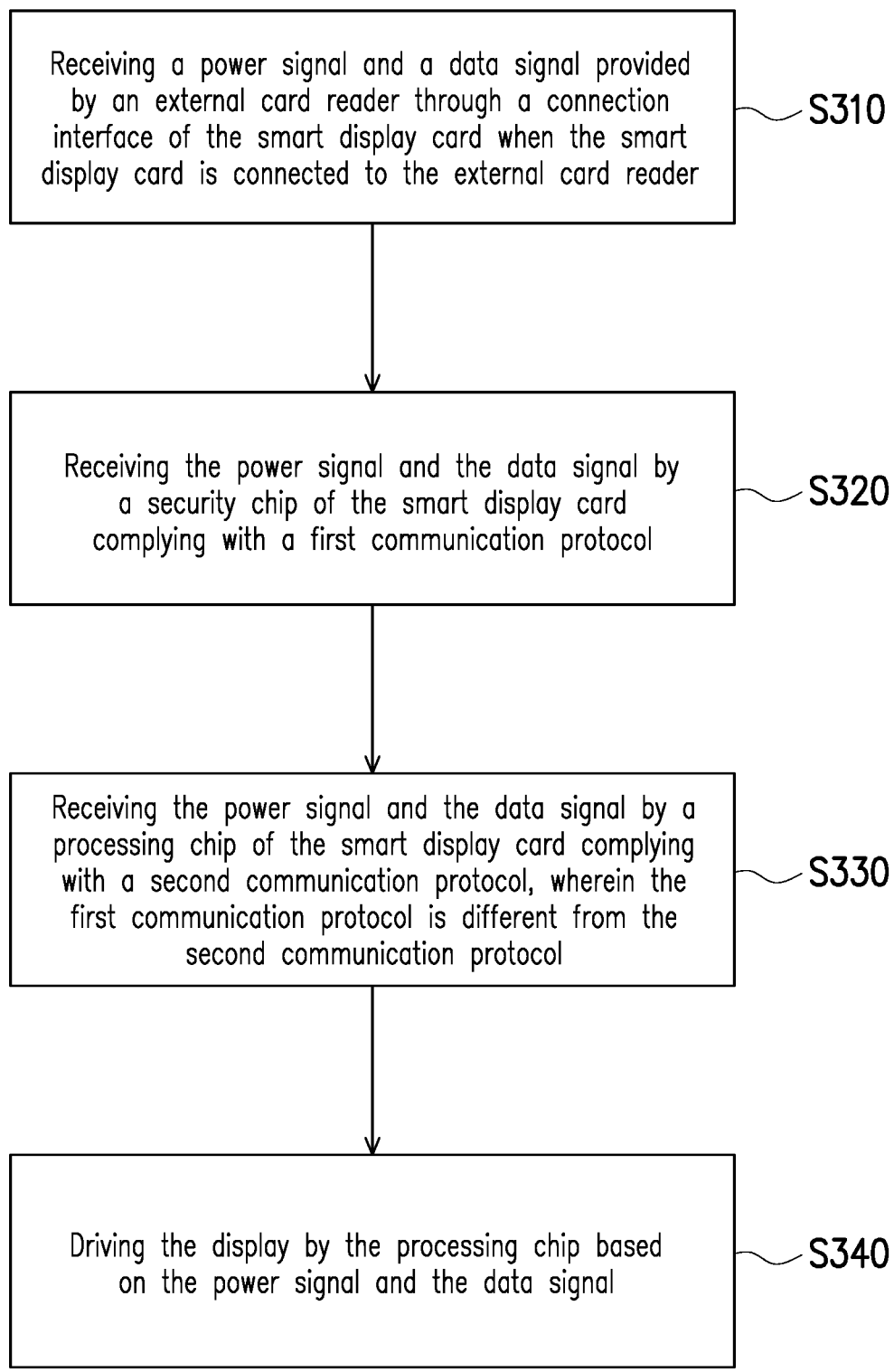
FIG. 3 is a flowchart of an operation method of a smart display card according to an embodiment of the invention.

FIG. 3 is a flowchart of an operation method of a smart display card according to an embodiment of the invention. The operation method of the smart display card in this embodiment is applicable to the embodiments of FIG. 1 and FIG. 2. With reference to FIG. 1 and FIG. 3, when the smart display card 100 is connected to the external card reader, the smart display card 100 can execute the following operations from step S310 to step S340. In step S310, when the smart display card 100 is connected to the external card reader, the smart display card 100 receives a power signal and a data signal provided by the external card reader by the connection interface 110. In step S320, the security chip 120 of the smart display card 100 complying with a first communication protocol receives the power signal and the data signal. In step S330, the processing chip 130 of the smart display card 100 complying with a second communication protocol receives the power signal and the data signal. The first communication protocol is different from the second communication protocol. In step S340, the processing chip 130 drives the electronic paper display 140 based on the power signal and the data signal. Therefore, the smart display card 100 of the present embodiment can provide the smart card functions and display functions at the same time. Among the steps described above, an order of step S320 and step S330 may be adjusted, i.e., step S330 may be executed first before step S320 is executed.

In addition, enough teaching, suggestion, and implementation regarding other device features, technical details and implementation methods of the connection interface 110, the security chip 120, the processing chip 130 and the electronic paper display 140 in this embodiment may be obtained from the embodiments of FIG. 1 and FIG. 2, and thus related descriptions thereof are not repeated hereinafter.

In summary, according to the smart display card of the invention and the operation method thereof, the processing chip for driving the electronic paper display is additionally disposed in the smart display card preset with the security card so the processing chip can directly receive the data signal and the power signal right by the connection interface correspondingly designed for the security card. Therefore, the smart display card of the invention does not need to conduct the security verification again for the processing chip in the smart display card. Also, since each of the security chip and the processing chip has a different communication protocol, there is no mutual interference between the security chip and the processing chip. As a result, the smart display card of the invention can have lower manufacturing cost and lower security verification cost and can provide the smart card functions and display functions at the same time.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A smart display card, comprising:

a connection interface, configured to receive a power signal and a data signal provided by an external card reader when the smart display card is connected to the external card reader, wherein the connection interface comprises an input/output pin, such that the input/output pin simultaneously provides the data signal to a security chip and a processing chip;

the security chip, coupled to the connection interface and commonly and directly coupled to the input/output pin, and receiving the power signal and the data signal provided by the input/output pin, wherein the security chip complies with a first communication protocol;

the processing chip, coupled to the connection interface and commonly and directly coupled to the input/output pin, and receiving the power signal and the data signal provided by the input/output pin, wherein the processing chip complies with a second communication protocol, and the second communication protocol is different from the first communication protocol; and a display, coupled to the processing chip, wherein the processing chip drives the display based on the power signal and the data signal.

2. The smart display card according to claim 1, wherein the connection interface comprises a power supply pin, and the security chip and the processing chip are commonly coupled to the power supply pin, such that the power supply pin simultaneously provides the power signal to the security chip and the processing chip.

3. The smart display card according to claim 1, wherein the data signal comprises at least one of a first data corresponding to the first communication protocol and a second data corresponding to the second communication protocol.

4. The smart display card according to claim 3, wherein the processing chip filters out the first data when the first data is received by the processing chip.

5. The smart display card according to claim 3, wherein the security chip outputs an error signal to the processing chip and to the external card reader through the connection interface when the second data is received by the security chip, and the processing chip filters out the error signal.

6. The smart display card according to claim 1, wherein the processing chip is coupled to the display by a serial peripheral interface, and the processing chip drives a plurality of electro-phoretic units in the display based on the data signal so as to update a display frame of the display.

7. The smart display card according to claim 1, wherein the first communication protocol is ISO7816, and a plurality of pins of the connection interface are determined based on the first communication protocol.

8. An operation method of a smart display card, comprising:
 receiving a power signal and a data signal provided by an external card reader by a connection interface of the smart display card when the smart display card is connected to the external card reader, wherein the connection interface comprises an input/output pin;
 simultaneously providing the data signal to a security chip and a processing chip by the input/output pin, wherein the security chip and the processing chip are commonly and directly coupled to the input/output pin;
 receiving the power signal and the data signal provided by the input/output pin by h security chip of the smart display card complying with a first communication protocol;
 receiving the power signal and the data signal provided by the input/output pin by h processing chip of the smart display card complying with a second communication protocol, wherein the first communication protocol is different from the second communication protocol; and
 driving the display by the processing chip based on the power signal and the data signal.

9. The operation method according to claim 8, wherein the data signal comprises at least one of a first data corresponding to the first communication protocol and a second data corresponding to the second communication protocol, and the operation method further comprises:
 outputting an error signal to the processing chip and to the external card reader through the connection interface by the security chip when the second data is received by the security chip, and filtering out the received error signal by the processing chip; and
 filtering out the first data received by the processing chip when the first data is received by the processing chip.

\* \* \* \* \*